2,815,091

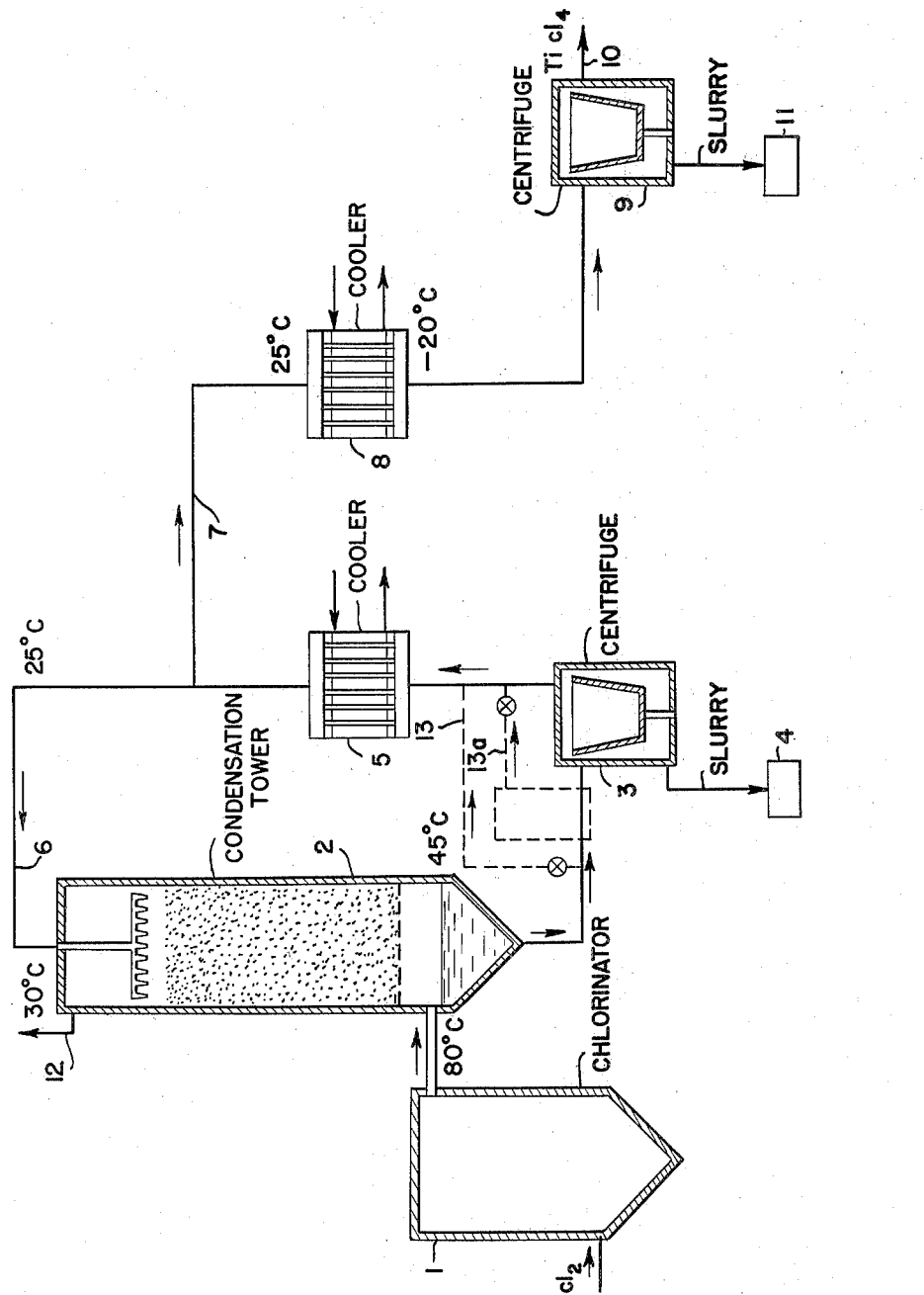

RECOVERY OF TITANIUM TETRACHLORIDE FROM CHLORINATION GASES

Robert J. Mas, Thann, and Paul R. Matthieussent, Neuilly, France, assignors to Fabrique de Produits Chimiques de Thann et de Mulhouse, Thann, France, a corporation of France Application November 18, 1955, Serial No. 547,600

Claims priority, application France November 28, 1954

12 Claims. (Cl. 183—120)

The present invention relates to an improved process for the recovery of titanium chloride, which can be considered as a step in the preparation of titanium oxide or metallic titanium.

As is known, titanium tetrachloride is obtained by the action of chlorine, at red heat and in the presence of reducing agents, on oxidized titanium compounds, such as ores or slags containing them, or similar titaniferous materials.

The gases coming out of the chlorinator contain therefore, in addition to gaseous vapors of $TiCl_4$, gases such as principally CO and $CO_2$, HCl, possibly $N_2$, and other volatilized metallic chlorides which consist principally of $FeCl_3$ along with $AlCl_3$ and sometimes $FeCl_2$. The vaporized metallic chlorides may also include $SiCl_4$.

It is necessary to separate these products of the reaction in order to recover a $TiCl_4$ which is sufficiently pure to serve as raw material for all the ultimate purifying treatments.

Many methods have been recommended for that recovery. Among them the best known and most frequently used consist in effecting a separation of the liquid and gaseous phases, for example, by separating various fractions through cooling and condensation steps, either through contacts of hot gases with cold walls or condenser surfaces or through dilution with cold gases, or through sprinkling with cold liquid $TiCl_4$. With such methods, one obtains at least one fraction containing a mixture of ferric and titanium chlorides, which are separated through distillation.

Those methods have the disadvantage of being expensive as they require large investments in equipment for condensations and fractional distillation and require a system of long and intricate piping in which the chloride deposits sometimes lead to serious obstructions. Further, the final distillation, which is a good process for eliminating all traces of iron from the $TiCl_4$, has the drawback of being costly, since it is operated on a large proportion of the produced $TiCl_4$ and it does not solve entirely the purifying problem due to the fact that it does not provide for the separation of the aluminum chloride, $AlCl_3$.

The present invention has for its principal object a process, which enables one to recover the titanium chloride by means of an apparatus which is simpler than those previously described, is easier to handle and has a cheaper upkeep and thereby leads to lower processing costs.

The invention provides, also, a cycle of recuperation of the $TiCl_4$ more effective and practical than those used at present, particularly in regard to the danger of obstruction of the pipe system and the removal of certain impurities such as the aluminum chloride.

The process according to the present invention consists firstly in condensing, by cooling, practically the whole of the condensable chlorides contained in the hot chlorination gases coming out of the chlorinator and secondly subjecting the resulting condensate to a mechanical separation of the liquid and solid phases. Through mechanical separation one obtains on one hand a liquid $TiCl_4$ practically free of suspended matter, and on the other hand a slurry containing practically all the solid phases, especially $FeCl_3$ and $AlCl_3$, and a relatively small proportion of the separated $TiCl_4$.

By "mechanical separation" is meant separation by such operations as centrifugation, simple settling or accelerated decantation as for instance through hydrocyclones. Centrifugation by the use of centrifugal machines and accelerated decantation by hydrocyclones may each be considered as a form of centrifugal separation. Such operations may be used individually or in appropriate combination, or one can even proceed to a centrifugal separation after a previous settling and decantation.

Centrifugation is, however, the preferred of such operations since it offers important industrial advantages, due to the fact that it permits a rapid and continuous production.

The process of this invention has many important advantages, including:

(a) The separation through methods such as distillation is made only on the obtained slurries and therefore affects only a very small proportion of the produced $TiCl_4$.

(b) The $TiCl_4$ separated by centrifugation being practically free of suspended matter and representing the larger part of the produced $TiCl_4$ can be conveniently and rapidly transferred to any convenient point without danger of obstruction in the conduits or other parts of the apparatus.

(c) The equipment can be reduced to a single condensation tower, instead of a set of towers with all the resulting complications.

With special reference to the last point, the treatment of chlorination gases by sprinkling with liquid and relatively cold $TiCl_4$ is known. But, in such previous methods, the cooled liquid $TiCl_4$ being merely condensed was heavily laden with impurities which presented the above mentioned risks of clogging. It was, therefore, necessary to purify the condensate by distillation, which is a very expensive method, and, in order to bring the cost down, it was necessary to reduce the quantity of recycled liquid $TiCl_4$ as much as possible.

In contrast to those previous methods, the present invention uses for the condensation of the metallic chlorides, large quantities of liquid $TiCl_4$ practically free of suspended matters which are provided by the mechanical separation as described above and which exceed by many times the quantity of $TiCl_4$ contained in the hot chlorination gases. According to the invention, the quantity of $TiCl_4$ circulated through the condensation tower preferably is from 50 to 100 times larger than the quanity of $TiCl_4$ produced in the chlorination. In this manner practically all the $TiCl_4$ is collected and the solids, such as $FeCl_3$ are diluted to an extent eliminating any possibility of choking or clogging parts of the recovery system.

On the other hand the large quantity of $TiCl_4$ which is recycled according to this invention does not affect in any way the quantity which must be distilled as the latter consists only of the $TiCl_4$ remaining with the solids or slurry from centrifugal separation. A skilled operator can determine easily and select for each case, with no appreciable influence on the cost of the operation, the quantity of $TiCl_4$ to be circulated in a closed cycle; taking into consideration the percentages of impurities to be eliminated, which depends upon the composition of the raw material or ore treated in the chlorinator. The great flexibility of such a process is readily apparent.

It should be noted that when the quantities of recycled TiCl$_4$ are so large that the liquid suspension formed in the condenser contains a relatively small amount of solids, a portion of such suspension may be directly recycled without being submitted to mechanical separation. The percentage of impurities permissible to recycling will govern the extent to which a part of the suspension can be recycled directly by short circuiting the mechanical separation.

According to an important embodiment of this invention, a cyclic process is provided for the production of TiCl$_4$, in which:

The metallic chlorides contained in the gases formed by the chlorination of the titaniferous material are condensed together by intimately contacting these gases in a condenser with a large quantity of cool liquid TiCl$_4$ practically free of suspended matter, which quantity is about 50 to 100 times greater than the TiCl$_4$ content of the chlorination gases;

At least a part of the resulting liquid suspension or condensate is subjected to a mechanical separation to remove suspended solids in the form of a concentrated slurry;

The TiCl$_4$ remaining in the slurry is selectively separated from the solids therein by suitable means, such as by distillation;

The entire quantity of the liquid TiCl$_4$ resulting from the previous operations, after benig cooled and diminished by withdrawing a portion thereof corresponding to a major proportion of the TiCl$_4$ content of the chlorination gases, is recycled into the condenser where it contacts and condenses the metallic chlorides from the continuing inflow of hot chlorination gases. The portion taken off, plus the small amounts of TiCl$_4$ distilled from the slurries, corresponds approximately to the quantity of TiCl$_4$ produced by the process.

According to a further feature of this invention, a large part or all of the liquid TiCl$_4$ coming from the mechanical separation step is chilled down to a temperature of 0° C. or below, preferably to about −20° C., in order to bring about a precipitation of solids, and the chilled material then is subjected to a second mechanical separation for the removal of the solid particles formed by the supplementary cooling. The liquid TiCl$_4$ thus treated preferably consists of the above mentioned portion taken off from the cyclic process. The solids formed and separated are collected again as a slurry containing TiCl$_4$.

The slurries obtained from the mechanical separation steps can be distilled or subjected to any other suitable operation in order to recover the small quantities of TiCl$_4$ which they contain. The liquid phase thus collected consists of TiCl$_4$ ready for final purification.

A complete cyclical process for the recovery of TiCl$_4$ from the chlorination gases in accordance with this invention is schematically illustrated on the accompanying drawing. The elements of equipment and the operations there illustrated include:

(a) A chlorinator 1.

(b) A condensation tower 2 in which the chlorination gases are intimately contacted with cool liquid TiCl$_4$ practically free of suspended matter, the cool liquid being introduced at a rate many times exceeding the TiCl$_4$ output of the chlorinator.

(c) The suspension formed by the condensation is conducted to a centrifugal separator 3 which brings about the mechanical separation between the solid and liquid phases. In many cases, the concentration of solids in the suspension is so small that a part of the suspension can be sent back through the by-pass 13, without passing through the centrifugal machine.

(d) The slurried solids discharged from the centrifuge, which consist principally of iron chlorides, are delivered to a suitable means of separation 4, such as a distillation unit, for the recovery of the TiCl$_4$ contained in the slurry.

(e) The liquid TiCl$_4$ flowing beyond the apparatus at 3 is cooled in a heat exchanger at 5 and then is recycled to the condenser through conduit 6. Although this liquid may still contain suspended solids, they are so fine and are kept so thinly suspended that no obstruction occurs in operation of the process.

(f) From the recycling stream an amount of liquid TiCl$_4$ is continuously taken off through conduit 7, which amount is substantially equal to the TiCl$_4$ output of the chlorinator 1, less the quantities of TiCl$_4$ present in the slurries at 4 and in the permanent gases at 12. This withdrawn liquid TiCl$_4$ is passed to a cooling system 8 which lowers its temperature below 0° C., preferably down to about −20° C., and from the cooling system the material is passed to a second centrifugal machine at 9, for the second mechanical separation. The recovered TiCl$_4$ comes out at 10, and a slurry composed of AlCl$_3$ and other impurities mixed with liquid TiCl$_4$ is suitably taken off at 11.

The following example will illustrate more fully the industrial characteristics of the process. It is to be understood that the data here given are not restrictive and should only be taken as an example of the manner of practicing the invention; one of its advantages being its flexibility and the relatively large ranges in which the conditions can be altered.

*Example*

The chlorinator yields per hour:

| | Kgs. |
|---|---|
| TiCl$_4$ | 44 |
| FeCl$_3$ | 5.6 |
| AlCl$_3$ | 4.2 |
| CO | 13 |
| CO$_2$ | 2.5 |

The gases come out of the chlorinator at about 800° C. and are led directly into the condensation tower, in which they are intimately contacted with 3,000 kg. per hour of TiCl$_4$ at 25° C., coming from the centrifugal machine.

The permanent gases come out of the condensation tower at about 30° C. and retain about 3 kg. per hour of uncondensed TiCl$_4$, which escapes with these gases.

The metallic chlorides in the hot gases are condensed and drawn down by the heavy flow of cool TiCl$_4$, forming a suspension which comes out of the condenser at, for example, about 45° C.

The suspension, if desired after a partial decantation, is passed through a centrifugal machine which collects, per hour, a little less than 20 kgs. of a slurry containing about 10 kgs. of TiCl$_4$ and 9.5 kgs. of FeCl$_3$—AlCl$_3$.

The liquid TiCl$_4$ substantially freed of solids is passed through a cooler where it is cooled, for example, to about 25° C.

About 3,000 kgs. of the cooled liquid TiCl$_4$ are recycled to the condensation tower, while about 31 kgs. thereof per hour are withdrawn from the circuit, in addition to the 3 kgs. of TiCl$_4$ escaping with the permanent gases.

The slurry collected from the centrifugal machine is distilled according to any usual practice, and the 10 kgs. of TiCl$_4$ which it contains are recovered.

It will be observed that less than one-fourth of the production of TiCl$_4$ has required a distillation, and that all the produced TiCl$_4$ contains only small amounts of suspended matter, which facilitates the ultimate purifying process.

The proportion of the recycled TiCl$_4$ can be varied widely, depending upon the amounts of insoluble chlorides contained in the chlorination gases. These amounts in turn depend upon the raw material used and upon the temperatures desired at the points where the uncondensed gases and the liquid condensate are removed from the condenser.

For example, if one has efficient means for recovering TiCl$_4$ from the residuary gases, less cooling is needed, and the volume of the reflux may be reduced by lowering its temperature.

The work of the centrifuge can be lightened by effecting a preliminary decantation of the liquid TiCl$_4$, as indicated at 13a, so as to treat only a suspension enriched in solids; or a part of the liquid suspension can by-pass the centrifuge, as indicated at 13.

Instead of using a centrifugal machine or a hydrocyclone, the mechanical separation of the solids can be effected by decantation or by filtration. For practical purposes, however, these last two methods are less advantageous because of the relatively small size of the particles in suspension. Decantation necessitates large decantation surfaces and raises problems of air tightness, as all contacts with air must of course be avoided. In the use of filters the clogging nature of the solid particles necessitates large filtering surfaces and makes it difficult to have a continuous process.

While the foregoing specification sets forth numerous details and examples to illustrate the practice of this invention, it will be understood that they may be varied widely without departing from the spirit or the scope of the disclosed invention which is intended to be defined by the appended claims.

We claim:

1. A process for the recovery of titanium tetrachloride from the hot gases produced by the chlorination of oxidic titaniferous material, said gases containing substantially all the metallic chlorides vaporized in the chlorination, which comprises cooling said gases in a condensation zone, and by contacting them therein with liquid TiCl$_4$, from a temperature substantially above the boiling points of all said chlorides to a temperature substantially below said boiling points, thus forming in said zone a suspension of solids in liquid TiCl$_4$, continually withdrawing said suspension from said zone and mechanically separating solids from said suspension to obtain a separate liquid TiCl$_4$ in which any solids remaining are so fine and so dispersed that they stay in suspension, and returning into said zone at least a part of the separate liquid TiCl$_4$ for cooling a further flow of said gases.

2. A process for the recovery of titanium tetrachloride from the hot gases produced by the chlorination of oxidic titaniferous material, said gases containing substantially all the metallic chlorides vaporized in the chlorination, which comprises cooling said gases in a condensation zone, and by contacting them therein with liquid TiCl$_4$, from a temperature substantially above the boiling points of all said chlorides to a temperature substantially below said boiling points, thus forming in said zone a suspension of solids in liquid TiCl$_4$, continually withdrawing said suspension from said zone and mechanically separating the constituents of said suspension into a concentrated slurry of solids in liquid TiCl$_4$ and a separate liquid TiCl$_4$ in which any solids remaining are so fine and so dispersed that they stay in suspension, and returning at least a part of the separate liquid TiCl$_4$ into said zone for cooling a further flow of said gases.

3. A process for the recovery of titanium tetrachloride from the hot gases produced by the chlorination of oxidic titaniferous material, said gases containing substantially all the metallic chlorides vaporized in the chlorination, which comprises cooling said gases in a condensation zone, and by contacting them therein with liquid TiCl$_4$, from a temperature substantially above the boiling points of all said chlorides to a temperature substantially below said boiling points, thus forming in said zone a suspension of solids in liquid TiCl$_4$, mechanically separating solids from said suspension to obtain a separate liquid TiCl$_4$ in which any solids remaining are so fine and so dispersed that they stay in suspension, and cooling and returning into said zone at least a part of the separate liquid TiCl$_4$ for cooling a further flow of said gases.

4. A cyclic process for the recovery of titanium tetrachloride from the hot gases produced by the chlorination of oxidic titaniferous material, said gases containing substantially all the metallic chlorides vaporized in the chlorination, which comprises cooling said gases in a condensation zone from a temperature substantially above the boiling points of all said chlorides to a temperature substantially below said boiling points by intimately contacting said gases in said zone with an amount of liquid TiCl$_4$ many times exceeding the TiCl$_4$ content of said gases, thus forming in said zone a highly dilute suspension of solids in liquid TiCl$_4$, mechanically separating solids from said suspension to obtain a separate liquid TiCl$_4$ in which any solids remaining are so fine and so dispersed that they stay in suspension, and returning into said zone most of the separate liquid TiCl$_4$ for cooling a further flow of said gases.

5. A cyclic process for the recovery of titanium tetrachloride from the hot gases produced by the chlorination of oxidic titaniferous material, said gases containing substantially all the metallic chlorides vaporized in the chlorination, which comprises cooling said gases in a condensation zone from a temperature substantially above the boiling points of all said chlorides to a temperature substantially below said boiling points by intimately contacting said gases in said zone with an amount of liquid TiCl$_4$ many times exceeding the TiCl$_4$ content of said gases, thus forming in said zone a highly dilute suspension of solids in liquid TiCl$_4$, mechanically separating solids from said suspension to obtain a separate liquid TiCl$_4$ in which any solids remaining are so fine and so dispersed that they stay in suspension, cooling the separate liquid TiCl$_4$ to substantially the temperature of said first-mentioned liquid TiCl$_4$, and returning into said zone most of the cooled liquid TiCl$_4$ for cooling a further flow of said gases.

6. A cyclic process for the recovery of titanium tetrachloride from the hot gases produced by the chlorination of oxidic titaniferous material, said gases containing substantially all the metallic chlorides vaporized in the chlorination, which comprises intimately contacting said gases in a condensation zone with a flow of liquid TiCl$_4$ containing from 50 to 100 times as much TiCl$_4$ as said gases, thus condensing in said zone nearly the entire amount of said vaporized chlorides and forming a highly dilute suspension of solids in liquid TiCl$_4$, mechanically separating solids from said suspension to obtain a separate liquid TiCl$_4$ in which any solids remaining are so fine and so dispersed that they stay in suspension, and returning into said zone a quantity of the separate liquid TiCl$_4$ sufficient to maintain the flow aforesaid.

7. A cyclic process for the recovery of titanium tetrachloride from the hot gases produced by the chlorination of oxidic titaniferous material, said gases containing substantially all the metallic chlorides vaporized in the chlorination, which comprises cooling said gases in a condensation zone from a temperature substantially above the boiling points of all said chlorides to a temperature substantially below said boiling points by intimately contacting said gases in said zone with an amount of liquid TiCl$_4$ many times exceeding the TiCl$_4$ content of said gases, thus forming in said zone a highly dilute suspension of solids in liquid TiCl$_4$, mechanically separating solids from said suspension to obtain a separate liquid TiCl$_4$ in which any solids remaining are so fine and so dispersed that they stay in suspension, returning into said zone most of the separate liquid TiCl$_4$ for cooling a further flow of said gases, withdrawing from the cyclic process a minor proportion of the separate liquid TiCl$_4$, chilling it to precipitate solids therein, and mechanically separating solids from the chilled liquid TiCl$_4$.

8. A process as described in claim 7, the withdrawn liquid TiCl$_4$ being chilled to a temperature below 0° C.

9. A process as described in claim 7, the withdrawn liquid TiCl$_4$ being chilled to a temperature of about −20° C.

10. A process for the recovery of titanium tetrachloride from the hot gases produced by the chlorination of oxidic titaniferous material, said gases containing substantially all the metallic chlorides vaporized in the chlorination, which comprises intimately contacting said gases in a condensation zone with a flow of liquid $TiCl_4$ containing from 50 to 100 times as much $TiCl_4$ as said gases, thus condensing in said zone nearly the entire amount of said vaporized chlorides and forming a highly dilute suspension of solids in liquid $TiCl_4$, mechanically separating solids from said suspension to obtain a separate liquid $TiCl_4$ in which any solids remaining are so fine and so dispersed that they stay in suspension, cooling to substantially the temperature of said first-mentioned liquid $TiCl_4$ and returning into said zone a quantity of the separate liquid $TiCl_4$ sufficient to maintain the flow aforesaid, withdrawing the remainder of the separate liquid $TiCl_4$ and chilling it to a temperature below 0° C. to precipitate solids therein, and mechanically separating solids from the chilled liquid $TiCl_4$ to obtain titanium tetrachloride substantially freed of solid matter.

11. A process for the recovery of titanium tetrachloride from the hot gases produced by the chlorination of oxidic titaniferous material, said gases containing substantially all the metallic chlorides vaporized in the chlorination, which comprises intimately contacting said gases in a condensation zone with a flow of liquid $TiCl_4$ containing from 50 to 100 times as much $TiCl_4$ as said gases, thus condensing in said zone nearly the entire amount of said vaporized chlorides and forming a highly dilute suspension of solids in liquid $TiCl_4$, mechanically separating the constituents of said suspension into a concentrated slurry of solids in liquid $TiCl_4$ and a separate liquid $TiCl_4$ in which any solids remaining are so fine and so dispersed that they stay in suspension, cooling to substantially the temperature of said first-mentioned liquid $TiCl_4$ and returning into said zone a quantity of the separate liquid $TiCl_4$ sufficient to maintain the flow aforesaid, withdrawing the remainder of the separate liquid $TiCl_4$ and chilling it to a temperature below 0° C. to precipitate solids therein, mechanically separating the constituents of the chilled liquid $TiCl_4$ into a concentrated slurry of solids in $TiCl_4$ and a titanium tetrachloride substantially freed of solid matter, and distilling $TiCl_4$ from the solids of said slurries.

12. A process for the recovery of titanium tetrachloride from the hot gases produced by the chlorination of oxidic titaniferous material, said gases containing substantially all the metallic chlorides vaporized in the chlorination, which comprises intimately contacting said gases in a condensation zone with a flow of liquid $TiCl_4$ containing from 50 to 100 times as much $TiCl_4$ as said gases, thus condensing in said zone nearly the entire amount of said vaporized chlorides and forming a highly dilute suspension of solids in liquid $TiCl_4$, removing said suspension from said zone, and thereafter recycling into said zone as the aforesaid flow of liquid $TiCl_4$ a portion of said suspension in which the solids present are so fine and so dispersed that they stay in suspension.

References Cited in the file of this patent

UNITED STATES PATENTS

| | | |
|---|---|---|
| 2,306,184 | Pechukas | Dec. 22, 1942 |
| 2,311,466 | Pechukas | Feb. 16, 1943 |
| 2,675,890 | Frey et al. | Apr. 20, 1954 |